United States Patent [19]

Helliwell et al.

[11] 4,407,020

[45] Sep. 27, 1983

[54] AUTOMATIC COMPENSATION CIRCUIT AND METHOD

[75] Inventors: Bradley A. Helliwell, Los Gatos; David G. Messerschmitt, Walnut Creek; Ronald J. Hagen, Livermore, all of Calif.

[73] Assignee: TRW Inc., Redondo Beach, Calif.

[21] Appl. No.: 180,530

[22] Filed: Aug. 25, 1980

[51] Int. Cl.³ .............................................. H04J 3/10
[52] U.S. Cl. .................................. 370/6; 340/347 M; 375/34; 375/25
[58] Field of Search .............................. 370/6, 58, 99; 340/347 M; 375/34, 24, 25

[56] References Cited

U.S. PATENT DOCUMENTS 4,288,873  9/1981  Gingell .................................... 370/6

Primary Examiner—Douglas W. Olms
Attorney, Agent, or Firm—Stephen E. Baldwin; Lawrence S. Cohen

[57] ABSTRACT

An automatic compensation circuit for use in a digital switching system. The circuit provides automatic compensation for each incoming channel of a pulse amplitude modulated (PAM) input signal. The circuit generates a compensation data word corresponding to the sign of each sample of the input PAM signal and increments or decrements the compensation word depending upon the sign of the previously sampled PAM signal for each channel, thereby providing automatic compensation dependent upon the value of the adjusted data word.

8 Claims, 3 Drawing Figures

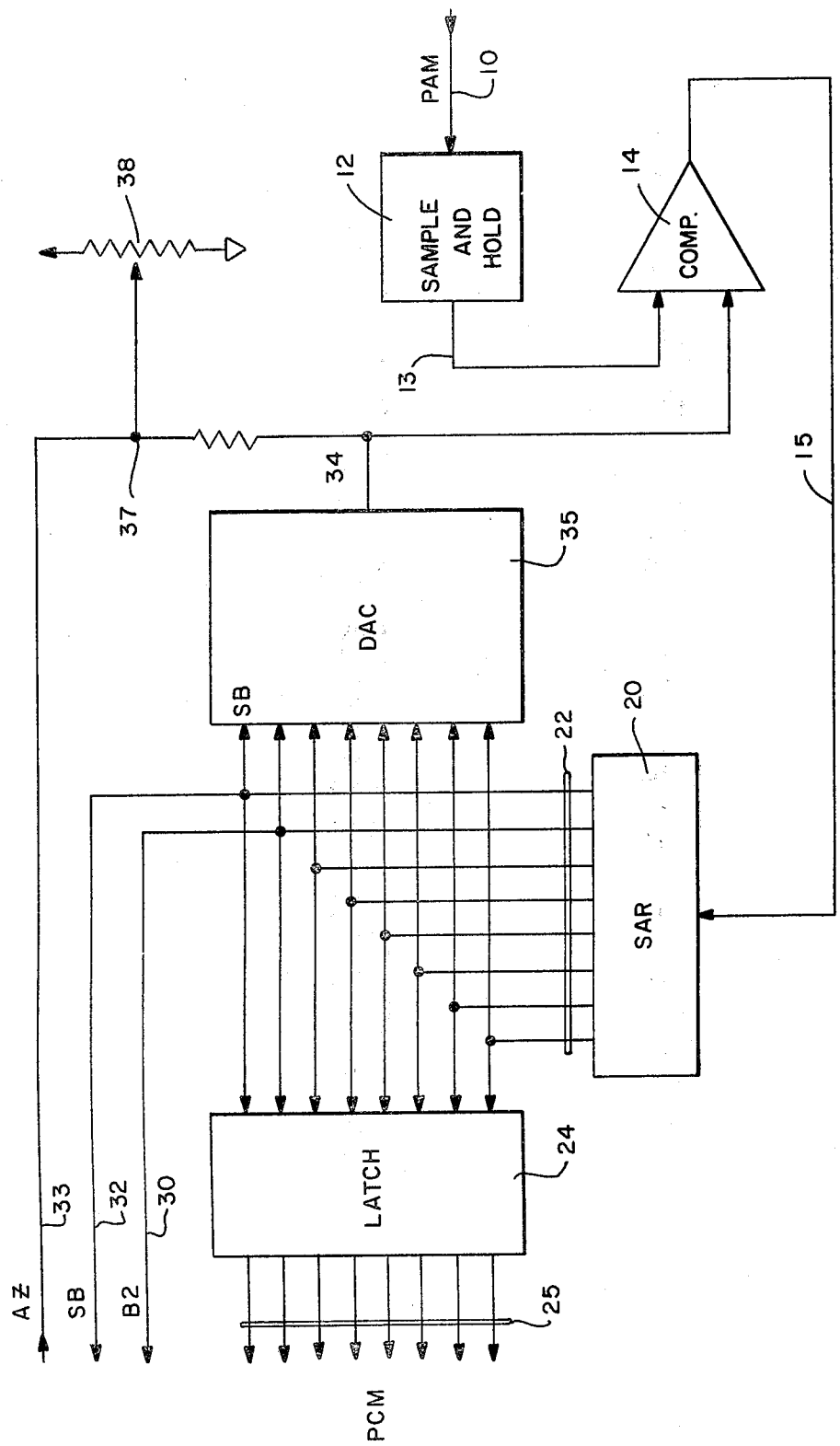
FIG.—1

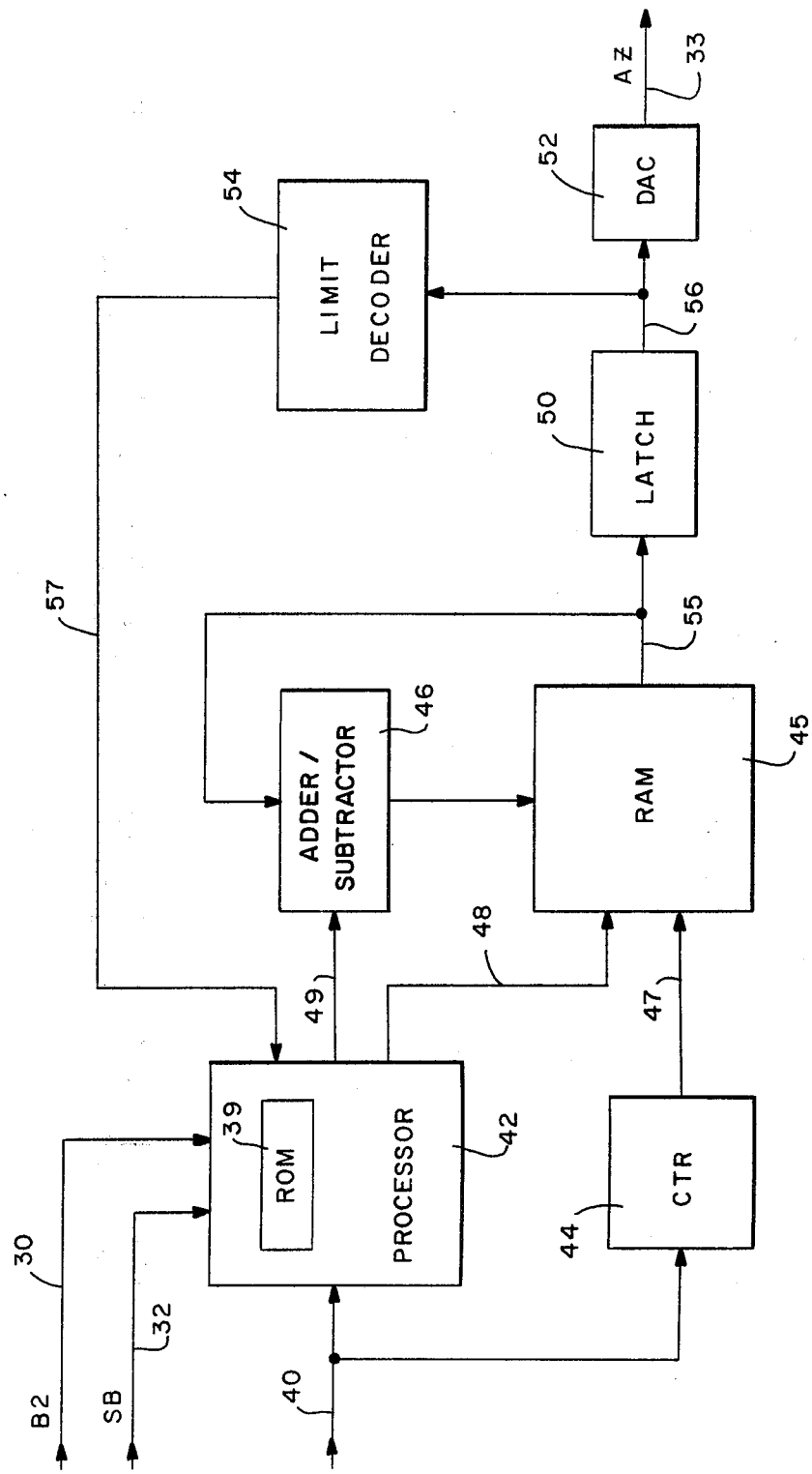
FIG.—2

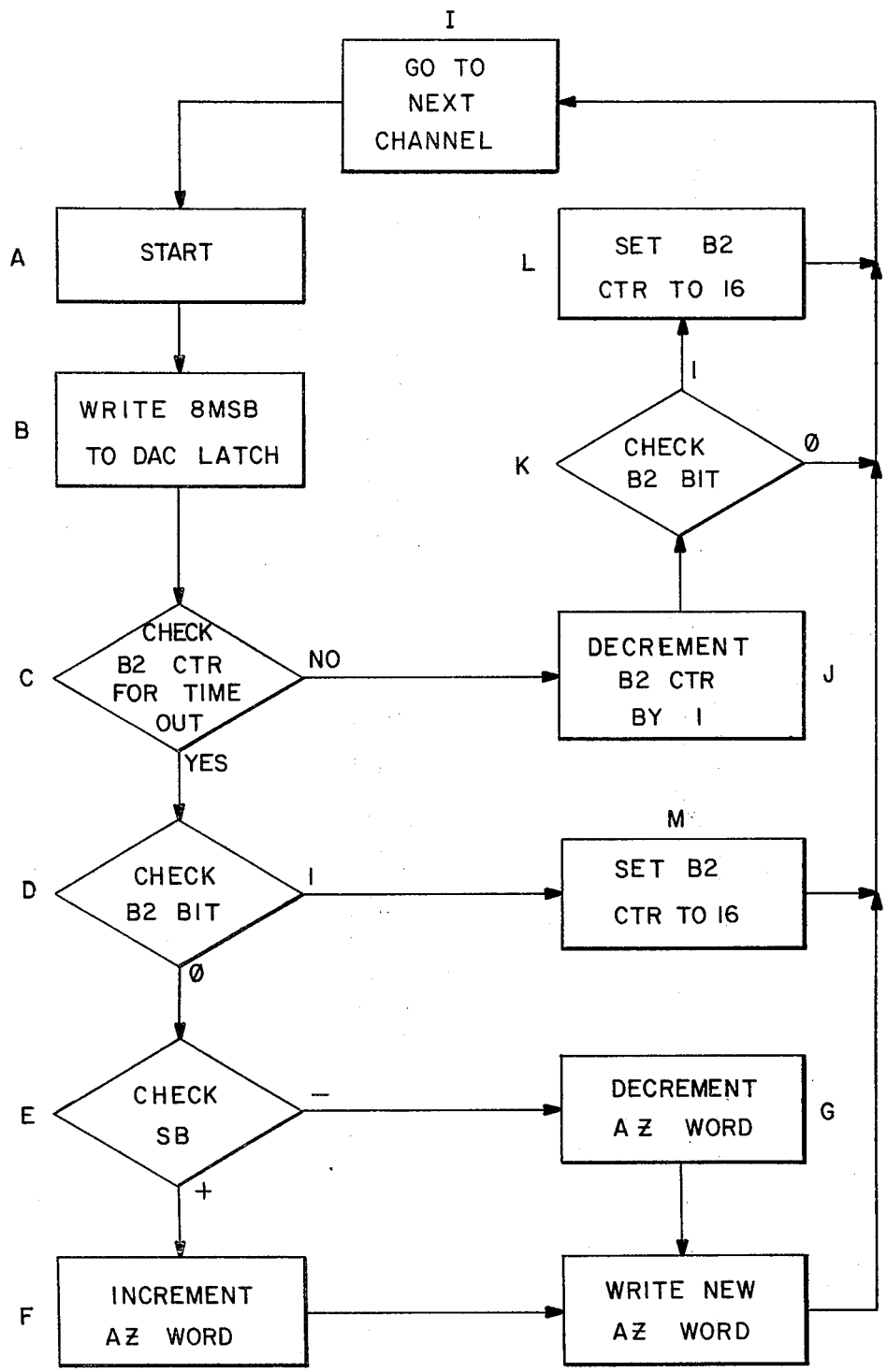
FIG.—3

AUTOMATIC COMPENSATION CIRCUIT AND METHOD

CROSS REFERENCE TO RELATED APPLICATIONS

"Integrated Transmission and Switching System", invented by John C. McDonald, et al., Ser. No. 874,521, filed Feb. 2, 1978 now U.S. Pat. No. 4,288,870.

BACKGROUND OF THE INVENTION

The present invention relates to an automatic compensation circuit and method for use in a digital switching system.

As digital telephone switching systems are being developed to replace existing analog telephone switching systems, a typical implementation utilizes pulse code modulated (PCM) switching techniques.

In order to convert analog signals into a PCM format, the analog signal is first converted to a pulse amplitude modulated (PAM) format where each analog signal is sampled at 8 KHz. A plurality of PAM samples are multiplexed into time frames of 24 voice channels recurring at a 125 microsecond ($\mu$s) rate. The PAM samples are converted to PCM format and then the PCM samples can be further multiplexed by known techniques to provide improved switching capabilities.

Typically, a PAM input signal is converted to a series of PCM serial samples utilizing, for example, a successive approximation register and digital to analog converter to convert the PAM samples into corresponding PCM samples.

In order to operate with digital switching systems, it is generally required that the input signal have no DC offset value (e.g., the average value of the pulse amplitude modulated signal is zero) since a DC offset level can affect the idle channel performance of the system. In particular, for an idle channel, a DC offset provides a bias which can increase the idle channel noise, decrease inter-channel crosstalk coupling loss, or both. An analog information signal, due to earlier AC coupling, has an average value of zero. However, an offset DC level is often found in digital switching systems because of the offset voltages in operational amplifiers used in active filters, offset voltages in sampling switches and the like. These offsets will typically be different on the different channels on a PAM bus.

Therefore, it would be desirable to provide improved circuitry which could compensate for offsets in DC levels for each channel of a PAM input signal.

In view of the above background, it is an objective of the present invention to provide an improved automatic compensation circuit for use in a digital switching system.

SUMMARY OF THE INVENTION

The present invention relates to an automatic compensation circuit and method for use in a digital switching system.

The circuit sampling means responsive to a pulse amplitude modulated (PAM) multichannel input signal for generating sampled PAM signals corresponding to each channel of the multichannel signal.

The circuit includes comparator means for comparing the sampled input signal for each channel with a first offset signal. The comparator means generates a sampled PAM signal, desirably without a DC offset level.

The circuit includes means for encoding or connecting the sampled PAM signal into a pulse code modulated (PCM) signal, means responsive to the sampled input signal for generating a first control signal representing the sign of the sampled input signal and means for storing a compensation or offset data word representing the current value of the DC offset voltage required to provide the corresponding PAM sample with no DC offset voltage level.

The circuit also includes means responsive to the first control signal for incrementing or decrementing the stored data word, depending on whether the first control signal has a first state (e.g., a digital "1") or second state (e.g., a digital "0"), respectively.

The circuit also includes means responsive to the adjusted data word for adjusting the offset voltage signal for each of the channels in the system.

In another embodiment, the circuit includes means responsive to the sampled input signal for each channel for generating a second control signal when the corresponding input channel exceeds a predetermined value, and means responsive to the second control signal for terminating or stopping the operation of the circuit for a predetermined period of time. This implementation provides additional protection for automatic compensation in the event of high-value asymmetrical waveforms being introduced into the system.

In accordance with the above summary, the present invention achieves the objective of providing an improved automatic compensation circuit for use in a digital switching system.

Other objects and features of the present invention will become apparent from the following detailed description when taken in conjunction with the accompanying drawings.

DESCRIPTION OF THE DRAWINGS

FIG. 1 depicts a block diagram of a pulse code modulated (PCM) encoding circuit.

FIG. 2 depicts an automatic compensation circuit according to the present invention.

FIG. 3 depicts a flow chart for illustrating the operation of the control circuit of FIG. 2.

DETAILED DESCRIPTION OF THE DRAWINGS

Referring now to FIG. 1, a block diagram of a pulse code modulated (PCM) encoding circuit is depicted.

An input signal on bus 10, in the form of a multichannel pulse amplitude modulated (PAM) signal, is input to a sample and hold (S/H) circuit 12. Typically, the PAM signal on bus 10 represents a time division multiplex signal comprising 24 voice information signals which have been pulse amplitude modulated to form a multi-channel signal, operating in a multi-frame format having time frames of 125 $\mu$s each. The circuit of FIG. 1 forms a pulse code modulated (PCM) signal on bus 25 through techniques known in the art, but which will be described briefly hereinbelow.

In operation, the sampled signal from circuit 12 is connected to comparator 14 via bus 13 which in turn connects the sampled signal to successive approximation register (SAR) 20 via bus 15. For each channel or time slot, SAR 20 and digital to analog converter (DAC) 35 generate an 8-bit PCM signal on bus 22 which corresponds to each sampled PAM signal on bus 13. DAC 35 connects the successively approximated signal from SAR 20 to comparator 14 via bus 34.

The PCM signal is connected from bus 22 through latch 24 to PCM bus 25 for connection to a digital switching system such as described in more detail in the cross-referenced application entitled "Integrated Transmission and Switching System", Ser. No. 874,521, filed Feb. 2, 1978.

In FIG. 1, an additional input signal on bus 33, designated the auto-zero (AZ signal), is connected via summing node 37 and offset network 38 to comparator 14. As described previously, the generation of the PCM signal for a digital switching system is desirably without any DC offset signal. While an analog information signal generally has average value zero, an offset DC level is often found in digital switching systems because of operational amplifier and sampling gate offsets.

Accordingly, the present invention generates an adjustable offset signal on bus 33 to compensate for the DC offset level for each channel of the input PAM signal on bus 10. The AZ signal bus 33 provides for adjustment of the DC offset signal during the comparison of the sampled signal on bus 13 and the converted signal from DAC 35 on bus 34.

In FIG. 1, an 8-bit PCM sample typically includes one sign bit representing the sign or polarity of the sample and seven bits representing the magnitude of the sample. The sign bit (SB) signal on bus 32 indicates the polarity or sign of the PCM sample corresponding to the sampled input signal for each channel of the PAM signal on bus 10. The bit 2 (B2) signal on bus 30 represents the most significant bit (MSB) position of the sampled signal. A B2 signal is indicative of the presence of a high level signal, which could cause excessive offset for which the present invention is designed to provide compensation.

Referring now to FIG. 2, an automatic adjusting circuit according to the present invention is depicted in more detail in which the SB signal on bus 32 and the B2 signal on bus 30 are connected to a processor 42, which is designed to control the operation of the automatic compensation circuit. Processor 40 receives timing signals from an external source on bus 40 as does counter circuit 44 which generates the necessary control signals for addressing RAM 45. A program for controlling the operation of processor 42 could be stored within ROM 39.

When a sampled signal is input to the circuit of FIG. 1, the SB signal on bus 32 represents the polarity or sign of the sampled signal and is connected to processor 42 of FIG. 2.

In FIG. 2, a random access memory (RAM) 45 is connected to receive address signals on bus 47 from counter 44 and control signals on bus 48 from processor 42. RAM 45 is connected to ADD/SUB circuit 46 via bus 55 and additionally to latch 50. RAM 45 stores a compensation or automatic adjustment data word for each channel corresponding to the polarity of sign of each sampled signal of the multichannel input signal.

For example, for a series of successively sampled PAM signals that have positive polarity, a successive series of SB signals on bus 32 having the same corresponding state are input to processor 42, which in turn modifies the respective compensation word stored in RAM 45.

Typically, for a 24-channel input PAM signal, RAM 45 has necessary storage capacity for storing 24×20 bits of information. For the 20 bits of information for each channel, 16 bits are provided for the compensation word. Storage capacity for 16 bits provides sufficient integration time for DAC 35 to perform the necessary conversions, thereby providing some degree of immunity to spurious noise. 4 bits are provided for counting 16 successive frames of data for a feature of the invention to be described hereinbelow.

For each successive SB signal for the corresponding channel received by processor 42, ADD/SUB circuit 46 will increment or decrement the count or value of the stored compensation word in RAM 45 depending upon the state of the SB signal (e.g., "1" or "0"). For example, successively sampled signals for a particular channel having the same sign or state will successively increment the compensation count in RAM 45 for that channel.

When an input signal changes polarity from positive to negative, the SB signal on bus 32 changes state and the ADD/SUB circuit 46 decrements the count or value stored for corresponding channel in RAM 45.

Limit decoder 54 is provided to insure processor 42 does not increment the compensation count above a predetermined state, thereby preventing undesirable oscillations.

As previously mentioned, latch 50 is connected to RAM 55 and the value is connected at the appropriate time to DAC 52, which converts the stored data word to an appropriate analog value on to bus 33, hereinbefore designated the AZ signal, for connection back to the circuit depicted in FIG. 1.

The AZ value therefore compensates for the DC offset signal which may be apparent in the PAM signal or which occurs as a result of physical characteristics of the system.

Generally, it is an object of the present invention to maintain a DC offset level of zero and this can be achieved by incrementing the count in the RAM 45 for each channel of the PAM signal for a sample having a first polarity and decrementing the count in RAM 45 for each channel of the system as a change of polarity occurs.

According to another aspect of the present invention, the B2 signal on bus 30 from FIG. 1 is connected to processor 42, which in response thereto terminates the operation of the automatic compensation circuit of FIG. 2. Experience has been that large signals, such as speech, do not have an equal number of zero and one SB bits on average, even if there is no DC offset. Thus, it is advantageous to suspend averaging in the presence of such a signal. When the B2 signal on bus 30 is one, it is indicative that a high-level signal is present and that the operation of the circuit could be seriously affected.

In one embodiment, the system suspends averaging of the SB bit for 16 consecutive samples for the corresponding channel or time slot after a one B2 bit has been observed. It has been observed that this overcomes the problem of high value asymmetrical waveforms, and can be implemented into the present invention as more fully described in conjunction with the flow chart depicted in FIG. 3, and which will be described in conjunction with FIGS. 1 and 2. A suitable program of instructions to be stored in ROM 39 could be written by one skilled in the art based upon the illustrative cycle of operation described hereinbelow when taken in conjunction with the accompanying drawings.

Referring now to FIG. 3, a flow chart depicting the operation of the present invention is illustrated in which, at Step B, the data words stored in RAM 45 are written into latch 50.

In the preferred embodiment, only the eight MSB from latch RAM 45 are written into latch 50 in order to provide the necessary resolution. Since RAM 45 stores 16 bits of resolution per channel, as previously described, utilizing only 8 MSB simplifies the hardware requirement of the system.

At Step C, a B2 counter (not shown) is checked for timeout because, as previously described, the indication of a B2 signal will terminate operation of the system for 16 samples or 16 counts in a counter crcuit, which could be contained within processor 4.

If the B2 counter had timed out, the next step (Step D) is to check the current B2 bit on bus 30. If the current B2 bit is zero (Step E), the sign bit is checked. If the sign bit is negative (at Step G), the auto-zero word is decremented.

At Step H, the new auto-zero word is written into RAM 45. At Step I, the system goes on to the next channel.

Returning to Step C, if the B2 counter has not timed out, the next step (Step J) is to decrement the B2 counter by one and check the current B2 bit (Step K). If the current B2 bit is zero, the system goes to the next channel, and if the current B2 bit is one (Step L), the B2 counter is set to 16 and the system goes on to the next channel.

At Step D, if the current B2 bit is one (Step M), the B2 counter is set to 16 in accordance with the description described above.

What is claimed is:

1. An offset compensation circuit comprising means connected to receive an input signal representing a recurring multichannel pulse amplitude modulated information signal, means for generating an offset control signal for each of said channels, means responsive to said offset control signal and said input signal for generating a sampled signal for each channel, means responsive to each sampled signal for generating a first control signal representing the sign of each sample, means for storing for each channel an offset data word corresponding to the sign of the previously sampled signal, means responsive to said first control signal for incrementing the stored offset data word for each channel when the first control signal has a first state and for decrementing the stored offset data word when the first control signal has a second state, and means responsive to the adjusted offset data word for adjusting the offset of the input signal for each channel during a subsequent time frame.

2. A circuit as in claim 1 including first logic means connected to receive said first control signal, memory means having storage locations for storing the offset data word corresponding to each of said channels, means responsive to said first control signal for incrementing or decrementing said offset data word when said first control signal has a first state or second state, respectively, and processor means for controlling said first logic means, said adder means and said memory means.

3. A circuit as in claim 2 wherein said processor means include second memory means for storing a program of instructions for controlling the operation of said circuit.

4. A circuit as in claim 2 including means responsive to said input signal for generating a second control signal representing a predetermined level of said input signal for each of said sampled channels and means responsive to said second control signal for terminating the operation of said circuit for a predetermined period of time.

5. A circuit as in claim 2 including limit decoder means for limiting the incrementing of said stored data beyond a predetermined count.

6. An automatic offset level circuit comprising sampling means for sampling an input signal representing a multichannel pulse amplitude modulated information signal recurring during a multiframe format, means for comparing each sampled signal with a corresponding offset signal each time frame thereby generating a pulse code modulated sampled signal, means responsive to said sampled input signal for generating a first control signal representing the sign of said sampled signal, means for storing an offset data word for each sample, said data word representing the current value of the offset voltage required to provide a series of pulse amplitude modulated samples with minimal DC offset value, means responsive to said first control signal for incrementing or decrementing said offset word when said first control signal has a first or second state, respectively, and means responsive to said adjusted offset data word for adjusting said corresponding offset signal for each of said channels.

7. An automatic compensation circuit comprising means responsive to a first input signal representing a plurality of pulse amplitude modulated information signals multiplexed into a multichannel format recurring at a predetermined time frame for generating sampled signals for each channel of said multiframe format, means for generating an offset control signal having a certain amplitude for each of said channels, means responsive to said offset signal and said sampled signal for each of said channels for generating a first control signal representing the sign of each of said samples, means for storing an offset data word for each of said samples corresponding to the sign of the sampled signals, means responsive to a first state of said control signal for incrementing said offset data word for each channel, means responsive to a second state of said control signal for decrementing the offset data word for each channel, and means responsive to the adjusted data word for adjusting the amplitude of said offset signal.

8. In an offset compensation circuit, the method comprising the steps of receiving an input signal representing a recurring multichannel pulse amplitude modulated information signal, generating an offset control signal for each of said channels, generating a sampled signal for each channel, generating a first control signal representing the sign of each sample, storing for each channel an offset data word corresponding to the sign of the signal, incrementing the stored offset data word for each channel when the first control signal has a first state and decrementing the stored offset data word when the first control signal has a second state, and adjusting the offset of the input signal for each channel according to the adjusted data word during a subsequent time frame.

* * * * *